(12) United States Patent
Homer

(10) Patent No.: US 10,223,569 B2
(45) Date of Patent: Mar. 5, 2019

(54) ARRANGEMENT AND METHOD FOR IDENTIFYING FINGERPRINTS

(71) Applicant: NOVOMATIC AG, Gumpoldskirchen (AT)

(72) Inventor: Alois Homer, Vienna (AT)

(73) Assignee: NOVOMATIC AG, Gumpoldskirchen (AT)

( * ) Notice: Subject to any disclaimer, the term of this patent is extended or adjusted under 35 U.S.C. 154(b) by 57 days.

(21) Appl. No.: 15/305,942

(22) PCT Filed: Apr. 22, 2015

(86) PCT No.: PCT/EP2015/058742
§ 371 (c)(1),
(2) Date: Oct. 21, 2016

(87) PCT Pub. No.: WO2015/162189
PCT Pub. Date: Oct. 29, 2015

(65) Prior Publication Data
US 2017/0053153 A1    Feb. 23, 2017

(30) Foreign Application Priority Data

Apr. 23, 2014   (AT) .................................. 50300/2014
May 30, 2014   (DE) ........................ 10 2014 008 160

(51) Int. Cl.
*G06K 9/00* (2006.01)
*G07C 9/00* (2006.01)
(Continued)

(52) U.S. Cl.
CPC .......... *G06K 9/00013* (2013.01); *A63F 13/73* (2014.09); *G01L 5/0038* (2013.01);
(Continued)

(58) Field of Classification Search
CPC ............ G06K 9/00013; G06K 9/00006; A63F 13/73; G01L 5/0038; G07C 9/00158; G07F 17/3241
See application file for complete search history.

(56) References Cited

U.S. PATENT DOCUMENTS 4,467,545 A * 8/1984 Shaw, Jr. ............ G07C 9/00158
                                                              42/70.01
5,546,471 A * 8/1996 Merjanian ............ A61B 5/1172
                                                                 356/71
(Continued)

FOREIGN PATENT DOCUMENTS

DE    19944140    3/2001
EP    0853795     7/1998
(Continued)

OTHER PUBLICATIONS

International Search Report for PCT/CN2014/058742, English Translation attached to original, Both completed by the European Patent Office on Jul. 13, 2015, All together 5 Pages.

*Primary Examiner* — Manav Seth
(74) *Attorney, Agent, or Firm* — Brooks Kushman P.C.

(57) ABSTRACT

Arrangement and method for identifying fingerprints, including at least one fingerprint sensor and at least two electrodes, wherein a fingerprint can be detected by the sensor. A first electrode is arranged in the vicinity of a hand support surface at a distance from the support surface such that when a finger is placed on the support surface, the thumb can be placed on the first electrode. At least one second electrode is arranged on the support surface such that at least one finger can be placed on the second electrode. The sensor and the first electrode and/or the at least one second electrode are each designed as one unit. Electric signals are transmitted to the hand via the electrodes by a measuring unit for applying and analyzing the electric signals, and the (Continued)

Figure 1:
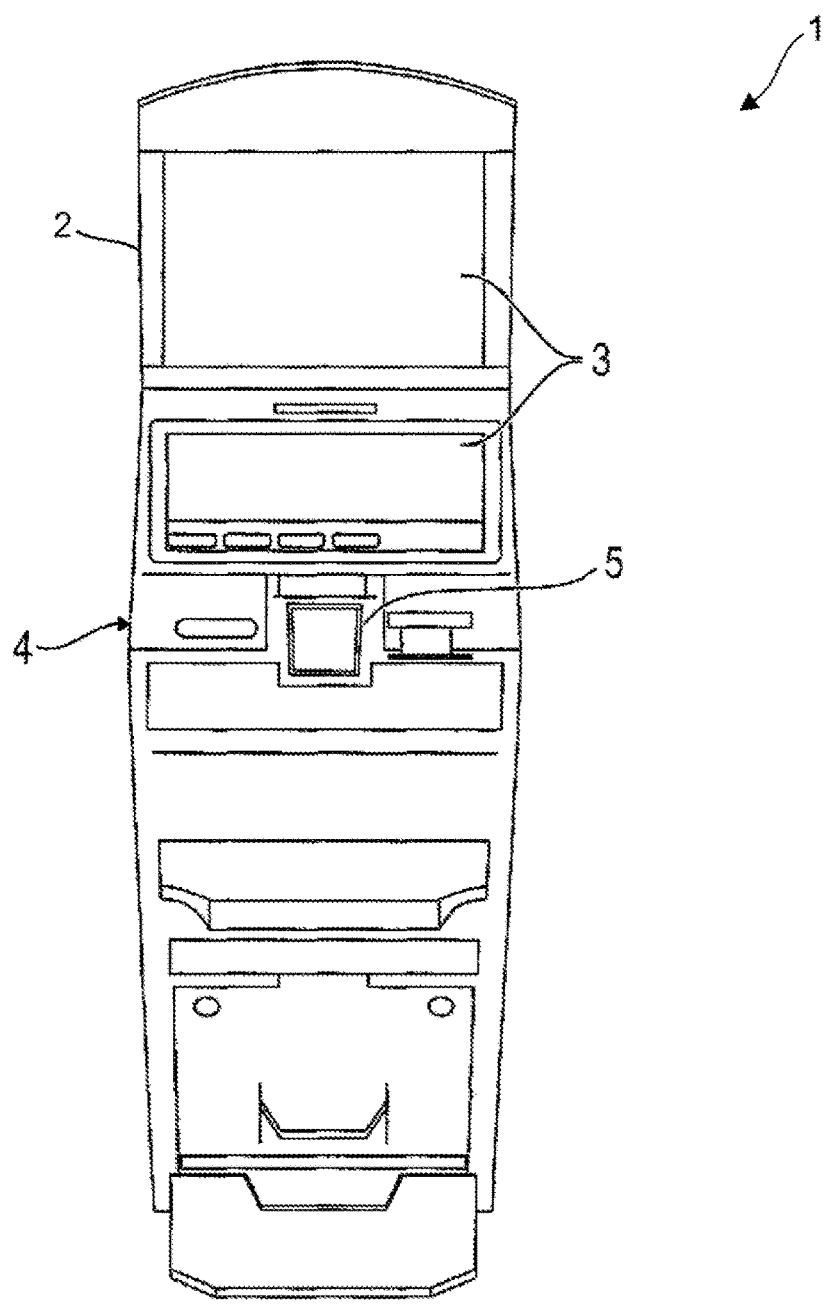

changes of the electric signals are detected. An identification result is ascertained using the detected fingerprints and signals.

20 Claims, 5 Drawing Sheets

(51) Int. Cl.
*A63F 13/73* (2014.01)
*G01L 5/00* (2006.01)
*G07F 17/32* (2006.01)

(52) U.S. Cl.
CPC ..... *G06K 9/00006* (2013.01); *G07C 9/00158* (2013.01); *G07F 17/3241* (2013.01)

(56) References Cited

U.S. PATENT DOCUMENTS

| | | | | |
|---|---|---|---|---|
| 5,729,334 | A * | 3/1998 | Van Ruyven | G06K 9/00013 356/71 |
| 5,812,252 | A * | 9/1998 | Bowker | F41A 17/066 250/227.11 |
| 5,937,557 | A * | 8/1999 | Bowker | F41A 17/066 102/472 |
| 6,100,811 | A * | 8/2000 | Hsu | B60H 1/00642 340/426.36 |
| 6,175,641 | B1 | 1/2001 | Kallo et al. | |
| 6,260,300 | B1 * | 7/2001 | Klebes | F41A 17/066 206/317 |
| 6,307,956 | B1 * | 10/2001 | Black | G06F 3/03545 382/124 |
| 6,374,652 | B1 * | 4/2002 | Hwang | G07C 9/00158 292/350 |
| 6,597,945 | B2 | 7/2003 | Marksteiner | |
| 6,980,672 | B2 * | 12/2005 | Saito | G06K 9/00006 340/5.53 |
| 7,023,319 | B2 | 4/2006 | Hwang | |
| 7,047,419 | B2 * | 5/2006 | Black | G06F 3/03545 235/379 |
| 7,113,070 | B2 | 9/2006 | Deng et al. | |
| 7,161,185 | B2 * | 1/2007 | Yamazaki | G09G 3/30 257/88 |
| 7,539,329 | B2 | 5/2009 | Sellers | |
| 7,590,269 | B2 | 9/2009 | Creasey et al. | |
| 7,961,914 | B1 * | 6/2011 | Smith | A45C 13/185 340/5.52 |
| 8,628,416 | B2 * | 1/2014 | Scott | G07F 17/3209 463/16 |
| 9,867,513 | B1 * | 1/2018 | Hall | A47K 13/24 |
| 2002/0034321 | A1 * | 3/2002 | Saito | G06K 9/00006 382/124 |
| 2004/0164845 | A1 | 8/2004 | Hwang | |
| 2006/0055509 | A1 | 3/2006 | Teshima et al. | |
| 2007/0137267 | A1 | 6/2007 | Pilatowicz et al. | |
| 2008/0249869 | A1 * | 10/2008 | Angell | G06Q 30/02 705/14.1 |
| 2010/0109838 | A1 | 5/2010 | Fisher | |
| 2010/0156594 | A1 * | 6/2010 | Chaikin | G07C 9/00563 340/5.53 |
| 2010/0246902 | A1 * | 9/2010 | Rowe | G06K 9/00033 382/115 |
| 2011/0057775 | A1 | 3/2011 | Joung et al. | |
| 2014/0028439 | A1 * | 1/2014 | Lien | G06K 9/00087 340/5.53 |
| 2014/0196636 | A1 | 7/2014 | Deweese et al. | |
| 2014/0338409 | A1 | 11/2014 | Kraus et al. | |
| 2015/0337571 | A1 | 11/2015 | Henderson | |
| 2016/0321493 | A1 * | 11/2016 | Pope | G06K 9/00013 |
| 2017/0046553 | A1 * | 2/2017 | Homer | G07C 9/00158 |
| 2017/0246332 | A1 | 8/2017 | Marshall | |

FOREIGN PATENT DOCUMENTS

| | | |
|---|---|---|
| EP | 0976897 | 2/2000 |
| EP | 1094750 | 5/2001 |
| WO | 2010051041 | 5/2010 |
| WO | 2011041619 | 4/2011 |

* cited by examiner

ARRANGEMENT AND METHOD FOR IDENTIFYING FINGERPRINTS

CROSS-REFERENCE TO RELATED APPLICATION

This application is the U.S. national phase of PCT Application No. PCT/EP2015/058742 filed on Apr. 22, 2015, which claims priority to AT Patent Application No. A50300/2014 filed on Apr. 23, 2014, and DE Patent Application No. 10 2014 008 160.5 the disclosures of which are incorporated in their entirety by reference herein.

TECHNICAL FIELD

The present invention relates to an arrangement for identifying fingerprints, comprising at least one fingerprint sensor and at least two electrodes, wherein it is possible to detect a fingerprint with the fingerprint sensor. Furthermore, the invention relates to an associated method for identifying fingerprints.

PRIOR ART

These days, fingerprint sensors are used in entry authorization systems such as turnstiles, entry barriers, etc. or in access authorization systems for identifying persons and hence for checking entry and/or access authorizations. Furthermore, fingerprint sensors may also be used in mobile devices such as e.g. smartphones, laptops, tablet PCs, etc. in order, for example, to check authorizations in respect of use of these devices or to restrict access to these devices to one or more authorized persons. In particular, fingerprint sensors may also find use in games and/or amusement and/or gaming machines, as are used in casinos or amusement arcades, or they can be used in devices actuated by money or monetary value (e.g. vending machines for selling e.g. wares or gaming chips) for identification purposes and for checking authorizations, etc.

Within the scope of the respective use, the fingerprint sensor usually serves for user identification, wherein a fingerprint sensor reads or detects biometric data, such as e.g. a print of a thumb or of a fingertip of a person by optical or electrical—usually capacitive—means. The detected biometric data or fingerprints can then be used in various ways. By way of example, a release apparatus connectable to the fingerprint sensor may, depending on the detected fingerprint, e.g. clear a device function, allow access to a respective device or lift a device block or allow entry to a region or release an entry barrier if the detected fingerprint corresponds to a stored fingerprint or comes sufficiently close to the latter. Conversely, if there is a sufficiently large deviation of a detected fingerprint from stored fingerprints, it is possible, for example, to deny entry, access or the use of a device. Particularly in the case of games and/or amusement and/or gaming machines, or in the case of mobile devices such as e.g. smartphones, tablet PCs, laptops, etc., it is possible to check whether an authorized or barred or non-authorized person attempts to actuate or use the respective device with the aid of the fingerprint.

An essential precondition for identifying persons or for checking authorizations is the protection against fakes. In particular, it is necessary to prevent non-authorized persons from obtaining entry, access or use authorizations for devices etc. by means of e.g. reproduced fingers, cut off fingers or fake fingerprints which, for example, are applied to the fingers by means of a film. Therefore, together with the fingerprint, it is essential also to carry out a check as to whether the person with this fingerprint is alive or whether, possibly, e.g. a film with fake fingerprints has been adhesively bonded to the fingers in order to simulate the corresponding authorizations. For so-called detection of life, it is possible, for example, to apply various methods for electronic person identification, by means of which it is possible, in addition to recording a fingerprint, to determine whether the associated person is alive. To this end, it is possible to record e.g. a pulse frequency or electrocardiographic signals or e.g. measure a skin temperature, mechanical properties of the skin surface, blood pressure, etc.

Document EP 0 853 795 B1 has disclosed a fingerprint sensor with detector for detection of life, in which an impedance measurement of a fingertip placed onto the fingerprint sensor is carried out. To this end, two point electrodes are provided on the bearing surface of the sensor, said electrodes having a strip-shaped embodiment and a meshing arrangement.

Then, a permittivity is measured at different frequencies of an applied voltage with the aid of these electrodes which lie very close together. However, the in document EP 0 853 795 B1 has a relatively complex setup of the electrodes. Furthermore, on account of the relatively small distance between the electrodes, measurement errors and/or faulty measurements, which may have to be repeated where appropriate, may easily occur, for example in the case of inaccurate positioning, in the case of slight movements of the placed finger or as a result of dirt on the sensor.

Document EP 1 094 750 B1 describes a method for detecting living human skin, in which a region of a skin surface, such as e.g. a fingertip, is brought into contact with one or two mutually insulated electrical conductors, where an electrical potential of a superposition of frequencies from a predetermined interval is applied. By way of example, the one electrical conductor or the two electrical conductors may be attached in a bearing surface for taking up a fingerprint. Initially, a reference characteristic is recorded for each person to be identified by means of the electrical conductor, said reference characteristic reproducing a frequency dependence of an ohmic resistance or an absolute magnitude of an impedance. This reference characteristic is then used for the detection of life for comparison with a recorded characteristic of the person to be identified. That is to say, in addition to e.g. a fingerprint, a reference characteristic for determining life is also recorded for each person to be identified. This leads to a relatively complicated registration method, in which it is necessary to record and store not only the fingerprint but also a reference characteristic or at least selected impedance values for the reference characteristic in a predetermined AC voltage frequency range.

Document WO 2010/051041 describes an apparatus and a method for identifying fake fingerprints, wherein prints of individual fingers or a plurality of fingers, or of relatively large areas of skin, are recorded. To this end, a plurality of electrodes are arranged in the bearing surface for the fingers in the apparatus. These electrodes provide electrical signals and a determination as to whether the recorded finger or fingers are real or not is then carried out on the basis of detected electrical signals, for example by determining the electrical impedance. However, the electrodes may be arranged in any configuration (e.g. as an electrode field, assigned to specific fingers, etc.) on the bearing surface, with a group of electrodes arranged at right angles being provided for each finger to be recorded when recording a plurality of fingers and each one of the fingers to be recorded being checked for authenticity. However, this leads to a relatively complex setup of the apparatus and much outlay when identifying fake fingerprints since each finger is checked in respect of authenticity by means of a dedicated electrode group. Furthermore, it may be difficult for the user to position the fingers on the respective electrode groups and an incorrect or inexact placement of the fingers may lead to measurement errors and/or incorrect measurements.

SUMMARY OF THE INVENTION

Therefore, the present invention is based on the object of specifying an arrangement and a method of the type set forth at the outset, by means of which the disadvantages of the prior art are avoided and the latter is ultimately developed in an advantageous manner—in particular, the reliability when identifying fingerprints should be increased and an error susceptibility should be reduced by simple handling in a simple manner and without a complicated setup.

According to the invention, the object is achieved by an arrangement and a method of the type set forth at the outset, having the features of the independent claims. Advantageous embodiments of the present invention are described in the dependent claims.

According to the invention, the object is achieved by an arrangement of the type set forth at the outset, in which a first electrode is arranged spaced apart from a hand bearing surface in the vicinity of said hand bearing surface in such a way that, when index finger and/or middle finger and/or ring finger and/or little finger of a hand is placed onto this hand bearing surface, the thumb of this hand is able to be placed against the first electrode. The first electrode may therefore also be able to be denoted as a thumb electrode. Furthermore, at least one second electrode is attached to the hand bearing surface in such a way that at least one finger selected from index finger, middle finger, ring finger or little finger is able to be placed onto at least the second electrode. The at least one second electrode may also be referred to as finger electrode. A fingerprint sensor, by means of which a fingerprint is detectable, and the first electrode and/or the at least one second electrode are embodied as a unit. That is to say, a fingerprint sensor may be assigned either to the first electrode or to the at least one second electrode, said fingerprint sensor then being able to detect a print of the respective finger (e.g. thumb or index finger), or one fingerprint sensor is in each case assigned to the at least two electrodes (i.e. first and at least second electrode), with prints of e.g. at least two fingers (e.g. thumb and index finger) being detectable in this case. Furthermore, the arrangement comprises a measurement unit for applying and evaluating electrical signals between the at least two electrodes. Here, the electrodes are coupled to the measurement unit by means of mutually electrically separated lines. By means of the arrangement, an identification result is established in a simple manner, said identification result e.g. possibly consisting of a fingerprint detected by the fingerprint sensor and signals detected by the measurement unit.

The main aspect of the arrangement for identifying fingerprints consists of simpler handling by the user being made possible by the arrangement of first electrode and the at least one second electrode and the assignment of a fingerprint sensor to at least one of the two electrodes, and hence of incorrect measurements and/or repetitions of measurements being reduced. The first electrode, which may e.g. be embodied as a unit with the fingerprint sensor, is arranged next to the hand bearing surface such that a thumb extending away from said hand bearing surface comes to rest, with the tip of the thumb, on the first electrode or on a unit made of fingerprint sensor and first electrode. If the remaining fingers of the same hand are placed onto the hand bearing surface, at least one of the remaining fingers is applied to the at least one second electrode, with the fingerprint sensor being able to be assigned to the at least one second electrode, or form a unit with the latter, as an alternative to the first electrode.

Optionally, it is also possible for one fingerprint sensor to be assigned to the at least two electrodes in each case; thus, e.g. the identification of a user may be improved and e.g. an error rate may be reduced in a simple manner as prints from at least two fingers may be used for the identification. By way of example, in addition to a print of the thumb, which is detectable by e.g. a unit made of first electrode and fingerprint sensor, it is also possible to detect a print of a further finger (e.g. of the index finger) by a further unit made of a further fingerprint sensor and the at least one second electrode. Then, if one of the detected fingerprints does not have an acceptable quality, use can be made, e.g., of the at least one further, detected fingerprint and the user may be identified in the case of appropriate quality. This may also avoid, or at least reduce, repetitions of measurements and/or the detection of fingerprints.

In the present invention, the spacing between the first electrode and the hand bearing surface is advantageously restricted to the usual thumb reach of a hand of average size.

Hence, correct positioning of thumb and remaining fingers for the identification is therefore intuitive and simple for the user, as a result of which measurement errors and/or incorrect measurements are also reduced. Hence, the identification of the fingerprint, including a detection of life, may be carried out with little time outlay and the reliability of e.g. checks for user clearance, entry and/or access authorizations may be increased.

It is advantageous if the hand bearing surface is configured as a handle, which is able to be grasped by the index finger and/or middle finger and/or ring finger and/or little finger of the hand. By grasping the handle, the user is intuitively led to correct positioning of the thumb and remaining fingers for identifying the fingerprint. By grasping the handle, at least one finger selected from index finger, middle finger, ring finger and little finger is automatically placed onto the at least second electrode. In the process, the thumb extending away from the grasped handle will—virtually by itself (on account of the hand geometry)—come to rest on the first electrode or the unit made of fingerprint sensor and first electrode, with the first electrode being able to be attached directly next to—i.e. within usual thumb reach of a hand of average size—the handle or else directly on the handle on a side of the handle facing the user.

In accordance with a further aspect of the present invention, the hand bearing surface may be provided on a device housing side—e.g. when applying the arrangement in a mobile device (e.g. a smartphone, a tablet PC, etc.) or in an amusement device or gaming machine.

This device housing side is arranged in an inclined manner in relation to a further device housing side, wherein the the first electrode or the unit made of fingerprint sensor and first electrode is attached to the further device housing side. In particular, the two housing sides, on which firstly the aforementioned hand bearing surface and secondly the first electrode or the unit made of fingerprint sensor and first electrode are arranged, may be aligned at approximately right angles in relation to one another. The handling for the user is very simple in this development of the invention as well. By way of example, while the stretched fingers of a hand rest on the one device housing side and the second electrode is contacted by at least one of the fingers, the thumb may, in a natural position so to speak, grip around a housing corner and, so to speak, rest on the first electrode or the unit made of fingerprint sensor and first electrode around the housing edge.

However, particularly when applying the arrangement in a mobile device such as e.g. a smartphone, a tablet PC, etc., the first electrode or the unit made of fingerprint sensor and first electrode may also be attached to a device housing front side—i.e. on that device housing side which has e.g. a display, operating buttons, etc. The hand bearing surface with the second electrode may then be arranged e.g. on the device housing rear side such that, when the mobile device is picked up in the hand, the thumb, in a natural position so to speak, may be positioned on the first electrode or the unit made of fingerprint sensor and first electrode on the front side of the device and the remaining fingers of the hand, likewise in a natural position so to speak, may be positioned on the hand bearing surface and hence on the second electrode on the rear side of the device. In the advantageous application of the arrangement in a mobile device, a fingerprint sensor may also be assigned either to the first electrode or the at least one second electrode, or both the first and the at least one second electrode may each form a unit with one fingerprint sensor.

In order to be able to appropriately use the arrangement equally well for the left hand and the right hand, the first electrode or the unit made of fingerprint sensor and first electrode may in each case be attached symmetrically in relation to a central axis of the hand bearing surface. Thus, in the case of a hand bearing surface embodied as a horizontal handle, for example, a first electrode may be attached to the left-hand side and a further electrode may be attached, like the first electrode, spaced apart on the right-hand side in the vicinity of this handle. Hence, the arrangement can be used very easily with both the left hand and the right hand. If a fingerprint sensor is integrated into the first or thumb electrodes arranged to the left and to the right of the hand bearing surface in each case, an identification of the fingerprints is able to be carried out in a simple manner with both the left hand and the right hand.

However, alternatively, a hand bearing surface appropriately adapted to the respective hand may be also be arranged symmetrically in relation to a central axis of the first electrode in each case. That is to say, for example, a first hand bearing surface may be used with the left-hand, with the thumb of this hand coming to rest on the first electrode. By way of example, a hand bearing surface arranged in a manner mirrored in the central axis of the first electrode may be used with the right hand. When index finger, middle finger, ring finger, and little finger are placed onto the second hand bearing surface, the thumb of the right hand is intuitively, or automatically, placed onto the first electrode.

In an advantageous development of the invention, the first electrode is not arranged or aligned rigidly in a fixed position relative to the hand bearing surface but instead it is movably arranged or movably mounted in order to be able to be brought into individual positions, i.e. positions appropriate for the respective user and his hand. Here, the first electrode may ideally be mounted in e.g. a rotatable and/or tiltable and/or translationally displaceable manner.

By way of example, the first electrode may be mounted in a manner rotatable or tiltable about at least one axis of rotation, wherein provision may be made for tiltability about a tilt axis which is aligned at least approximately perpendicular to the bearing surface of the first electrode or of the fingerprint sensor if, for example, the latter forms a unit with the first electrode, and/or about a tilt axis which is aligned at least approximately parallel to a plane in which the bearing surface of the first electrode or of the fingerprint sensor, if the latter is e.g. assigned to the first electrode, lies or to the plane to which the bearing surface nestles. By way of example, when arranged on an upright device housing side, the first electrode may be tiltable about an upright tilt axis and/or tiltable or rotatable about a horizontal tilt axis which extends parallel to the upright device housing side on which the first electrode is arranged. As an alternative or in addition to the aforementioned upright and horizontal tilt axes, the first electrode may also be tiltable or rotatable about a horizontally extending tilt axis which is substantially perpendicular to the device housing side on which the first electrode is arranged.

As an alternative or in addition to such a tiltability or rotatability, the first electrode or a unit made of fingerprint sensor and first electrode, if the fingerprint sensor is e.g. assigned to the first electrode, may also be mounted in a translationally displaceable manner, in particular in a plane approximately parallel to the device housing side on which the first electrode or the unit made of fingerprint sensor and first electrode is provided. By way of example, the first electrode or the unit made of fingerprint sensor and first electrode, if the fingerprint sensor forms a unit with the first electrode, may be displaceable upward and downward and/or left and right on an upright device housing front side in order to be in an ideal position relative to the hand bearing surface for the further fingers. If the first electrode is arranged on a horizontally aligned device housing side, the first electrode or the unit made of fingerprint sensor and first electrode, if the fingerprint sensor forms a unit with the first electrode, may be displaceable to the right and left and/or forward and backward.

It is furthermore expedient if the first electrode and the at least one second electrode is produced from a light-transmissive material. As a result, the respective electrode—i.e. the first electrode or the at least one second electrode or the at least two electrodes—can easily form a unit with a respective fingerprint sensor without interfering with, or impairing, the functionality of the latter or the detection of fingerprints. By way of example, the respective electrode may be applied on the respectively provided fingerprint sensor. Furthermore, this allows a determination of life to be carried out approximately parallel with the detection of a fingerprint by the fingerprint sensor, or immediately after the detection.

Ideally, the at least one second electrode may also comprise a further, i.e. second, fingerprint sensor. As a result, it is possible to detect at least one further print of a further finger in addition to the print of the thumb which is detectable by the unit made of fingerprint sensor and first electrode. In this way, for example, the identification of a user is improved and, for example, an error rate is reduced since prints of at least two fingers may be used for the identification. By way of example, if a detected fingerprint does not have an acceptable quality, use can be made of e.g. the at least second, detected fingerprint and the user may be identified in the case of appropriate quality. As a result, it is also possible to avoid, or at least reduce, repetitions of measurements and/or the detection of fingerprints.

In an advantageous development of the invention, the at least one second electrode is embodied as a force-effect detection unit, in particular as e.g. a pressure switch or pressure sensor. Here, the electrical signals are only applicable to the respective electrode, or able to be tapped or evaluated, by the measurement unit in the case of force exerted onto the force-effect detection unit by the appropriate finger. Optionally, the first electrode may also be embodied as a force-effect detection unit. By embodying the at least second electrode as a force-effect detection unit, the fingerprint is only identified once a force is applied to the contact surface by the corresponding finger applied to the second electrode. By way of example, the force-effect detection unit may be based on a spring-force restoration and embodied as a pressure switch. Alternatively, use can be made of e.g. a force-measuring, electrical resistor such as e.g. a so-called force-sensing resistor (FSR) and the force-effect detection unit may therefore be embodied as a pressure sensor. Applying or tapping and evaluating electrical signals to/from the electrodes only takes place when, for example, a pressure threshold or a threshold of the electrical resistance has been reached. As a result, the reliability of the arrangement in relation to manipulation is additionally increased since, for example, such a force application is not readily possible with an entirely artificial finger or an entirely artificial hand, onto which fingerprints have been applied for manipulation purposes.

Ideally, the arrangement is able to be used in a device such as e.g. an amusement device or a gaming machine in order, for example, to easily, quickly and reliably check the identity and authorizations of a user. Occasionally, a bearing surface for the fingers of an open hand, i.e. index finger, middle finger, ring finger and/or little finger, is provided on gaming machines or other devices of the type set forth at the outset such that the user of the device may place the open hand on the aforementioned bearing surface. By selecting a suitable distance between the hand bearing surface, in particular the handle, with the at least one second electrode and the first electrode, it is possible, in an advantageous manner, to realize—indirectly—an age restriction when the arrangement is used in a gaming or amusement device. Here, the distance between the hand bearing surface and the first electrode is dimensioned for e.g. for a mean thumb length of a hand of an adult, preferably 60 to 80 mm. As a result, e.g. children or adolescents are then no longer able to place the thumb on the first electrode when the hand is placed onto the hand bearing surface or when the handle is grasped because the distance is too large. Consequently, the e.g. device cannot be put into operation as a result thereof.

Furthermore, operating buttons may be provided on the bearing surface—such as e.g. a pressure switch or a rocker switch, by means of which device functions are controllable. Here, for example, the at least one second electrode may be integrated into the respective operating button or attached to the latter. Furthermore, such a bearing surface may be provided on a horizontal housing portion such as e.g. a horizontally aligned keyboard portion. Alternatively, such a bearing surface for the stretched fingers of a hand may also be arranged on an upright side surface, for example in order to be able to actuate the flippers on a pinball machine, on which the actuation buttons for the flippers are attached laterally on the right and on the left.

The first electrode and the aforementioned hand bearing surface with the at least second electrode, with a fingerprint sensor being assigned to at least one of the at least two electrodes, and the measurement unit may be arranged immediately on/in the device housing of the gaming machine or main device. However, in an alternative development of the invention, the device having the first electrode, the fingerprint sensor assigned to at least one of the electrodes and the hand bearing surface may be embodied as a separate input device as well, in which e.g. the measurement unit is also arranged and which has an interface for connection to the main device, e.g. in the form of a gaming machine or a PC. The aforementioned interface may e.g. comprise a serial interface, for example embodied in the form of a USB interface or a LAN or WLAN interface.

Furthermore, the arrangement may advantageously also be employable in a mobile device, such as a smartphone or tablet PC, in order, for example, to protect these from use or access by unauthorized persons. The first electrode or the unit made of fingerprint sensor and first electrode may in this case be attached to e.g. a device housing front side which, for example, comprises display, operating buttons, etc. Ideally, the first electrode or the unit made of fingerprint sensor and first electrode is integrated into an operating button (e.g. on/off switch, etc.) or attached to the latter. The hand bearing surface with the at least second electrode may, for example, be arranged on one of the side surfaces of the mobile device or on the device housing rear side. Alternatively, or additionally, the hand bearing surface with the second electrode may, however, also be applied to a device protective sleeve—a so-called cover—e.g. laterally or on the rear side thereof and, for example, be contacted through, or electrically connected, to the mobile device. Optionally, the device protective sleeve may also have a corresponding cutout such that an application of index finger and/or middle finger and/or ring finger and/or little finger onto the at least one second electrode is easily possible. By providing appropriate cutouts in the device protective sleeve, the user can furthermore easily be instructed to such an extent that the fingers are placed automatically onto the at least one second electrode.

The specified object is furthermore solved by a method of the type set forth at the outset, in which the arrangement according to the invention is used, said arrangement having at least one fingerprint sensor and at least two electrodes and a measurement unit, wherein a unit is formed by the fingerprint sensor and a first electrode or by the fingerprint sensor and an at least second electrode or respectively one fingerprint sensor is assigned to both the first electrode and the at least one second electrode and hence at least two units made of electrode and fingerprint sensor are formed. For the purposes of identifying a fingerprint, the thumb of one hand is placed on the first electrode and at least one further finger selected from index finger, middle finger, ring finger or little finger is placed on the at least one second electrode, wherein a fingerprint sensor is assigned to at least one of the electrodes. Here, the at least one second electrode is attached to a hand bearing surface which is arranged in the neighborhood—ideally within the usual thumb reach of a hand of average size—at a distance from the first electrode. A fingerprint is detected by the fingerprint sensor—for example in an optical or electrical—usually capacitive—manner or by means of ultrasound imaging. By way of the first electrode and the at least one second electrode, electrical signals are transferred to the hand applied by way of the thumb and fingers and the measurement unit then detects and evaluates the electrical signals modified by the hand applied to the electrodes. Here, an identification result is established on the basis of the detected fingerprint and the electrical signals detected by the measurement unit.

The main aspect of the method for identifying fingerprints consists of it being possible, in a simple manner and almost in one step, to detect a fingerprint of a user and to carry out a so-called life detection—i.e., a check is carried out as to whether the detected fingerprint originates from a living person. The user is guided to a correct position for the fingerprint identification by simple handling, i.e., in particular, by the defined hand bearing surface, as a result of which it is possible to reduce error-afflicted measurements and/or repetitions of measurements. Hence, the identification of the fingerprint, including a determination of life, may therefore be carried out with little time outlay and the reliability of e.g. checks for usage clearances, entry and/or access authorizations can be increased.

Here, it is advantageous if a detected fingerprint is forwarded to an overarching system such as e.g. a computer system, in which e.g. fingerprints of authorized persons are stored. Then, an evaluation and analysis of the detected fingerprint may be carried out in this overarching system. By way of example, a check can be carried out as to whether a detected image of a fingerprint has sufficiently acceptable quality for the evaluation. A lack of quality may arise as a result of e.g. an image contrast that is too low, a detection of an insufficient region of the fingerprint or an insufficient number of so-called minutiae points of the fingerprint. The detection of the fingerprint may be repeated in the case of an insufficient quality of the fingerprint image. If the detected fingerprint image has sufficient quality for the evaluation and analysis, it may be processed further by the overarching system in order to assist the electrical analysis of wrong or counterfeit fingerprints.

An expedient development of the invention provides for the modified electrical signals, detected by the measurement unit by way of the electrodes, to be compared with a predetermined region, in particular for the determination of life, by the measurement unit. What is established here is whether the detected, electrical signals lay e.g. within specific thresholds of a specific person which were recorded and stored during e.g. a registration phase of this person or whether they correspond, in general, with thresholds for a human. If the detected, electrical signals lie within the specific or general thresholds or within the predetermined range for the detection of life, the detected finger or the associated fingerprint is accepted as real or genuine. If a deviation from the predetermined region or the thresholds is determined, the detected finger is e.g. declared a fake.

Expediently, an imitation value may be created by the measurement unit on the basis of a comparison of the detected, electrical signals with the predetermined range and e.g. output and/or forwarded by the measurement unit to the overarching system for evaluation and analysis. By way of the imitation value, the identified finger or the detected, electrical signals may be classified with a probability for a fake (e.g. reproduced finger with an applied fingerprint, cut-off finger, etc.). Then, a high or low probability for an imitated or so-called fake finger may be derived, for example on the basis of a level of the imitation value (e.g. number of points, numerical value, etc.). With the aid of the overarching system, a decision can then be made on the basis of the imitation value as to whether e.g. the finger is accepted as real or evaluated as faked.

Voltage signals with a variable amplitude and/or frequency are ideally used as electrical signals which are transferred by the electrodes to the applied fingers. By way of example, such voltage signals can very easily be generated with the aid of a direct current (DC) voltage or alternating current (AC) voltage signal source (e.g. pulsed DC current source, signal generator, etc.). By way of example, such signal sources may be integrated into the measurement unit or embodied separately therefrom. The signals may be guided to one or more electrodes by way of lines, by means of which the electrodes are coupled to e.g. the measurement unit and/or the signal source. Ideally, the lines, by means of which the individual electrodes are coupled to the measurement unit and/or the signal source, are electrically insulated from one another such that the electrical signals from/to the individual electrodes do not influence one another and possibly lead to measurement errors. In accordance with a further embodiment, the electrodes may partly be connected as an ESD protection for dissipating electrostatic charges and, in part, be provided for an impedance measurement and be connected to the measurement unit.

In an advantageous development of the invention, at least the at least one second electrode is embodied as a force-effect detection unit. Only in the case of a force exerted by the appropriate finger onto the force-effect detection unit are the electrical signals applied to the respective electrode by the measurement unit. Tapping or evaluating the electrical signals modified by the fingers applied to the electrodes is only carried out when a predetermined threshold for the exerted force on the force-effect detection unit is exceeded. Optionally, the first electrode may also be embodied as force-effect detection unit.

By way of example, the force-effect detection unit may be based on spring force restoration and may be configured as a pressure switch. Then, a spring pressure threshold is advantageously predetermined as threshold for the force-effect detection unit. Alternatively, use can be made of e.g. a force-measuring, electrical resistor such as e.g. a so-called force-sensing resistor (FSR) and the force-effect detection unit may therefore be embodied as a pressure sensor. That is to say, a passive component, which operates as a variable electrical resistor and which changes or reduces the resistance value thereof e.g. with increasing force on the sensor, is used in the force-effect detection unit configured as a pressure sensor. Applying or tapping or evaluating the electrical signals at the electrodes then only takes place once the corresponding threshold—e.g. a pressure threshold or threshold of the electrical resistance—is reached or exceeded. Furthermore, provision can be made of an indication apparatus (e.g. LED, etc.), by means of which reaching of the corresponding threshold of the force-effect detection unit is indicated, e.g. by lighting up, a color change, etc. Hence, the user is provided with feedback that a further exertion of force on the force-effect detection unit is no longer necessary.

The security in relation to manipulation may be additionally increased in a simple manner by the configuration of at least the second electrode as a force-effect unit. This is because a corresponding action of force is not readily realizable e.g. with an imitated, artificial finger (e.g. rubber finger) or an imitated hand (e.g. rubber hand), onto which fingerprints were applied for manipulation purposes.

IMPLEMENTATION OF THE INVENTION

Figure 2:
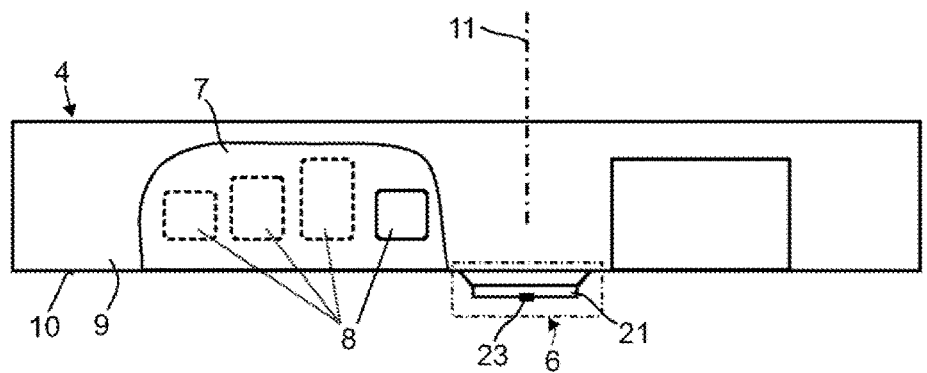
Figure 3:
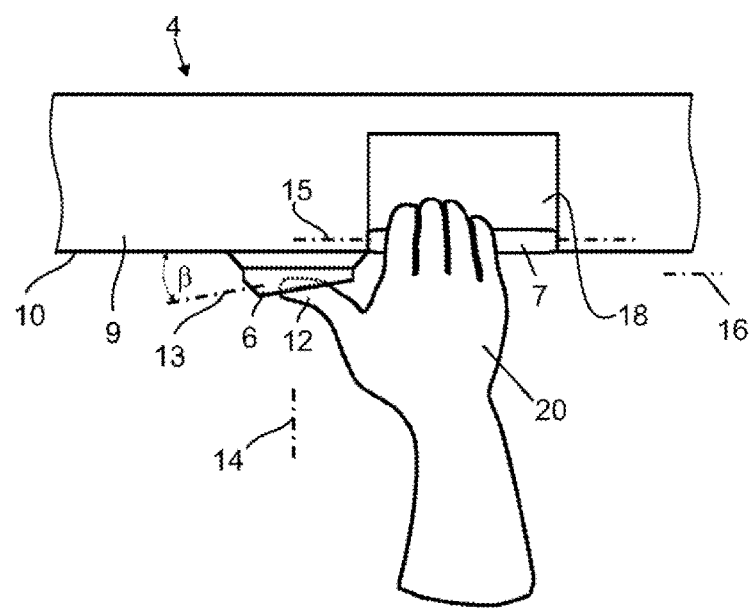
Figure 4:
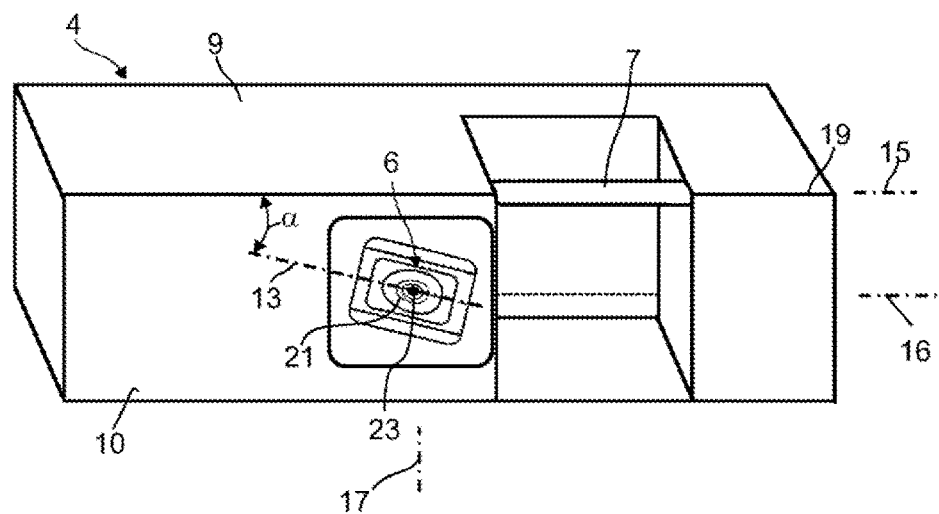
Figure 5:
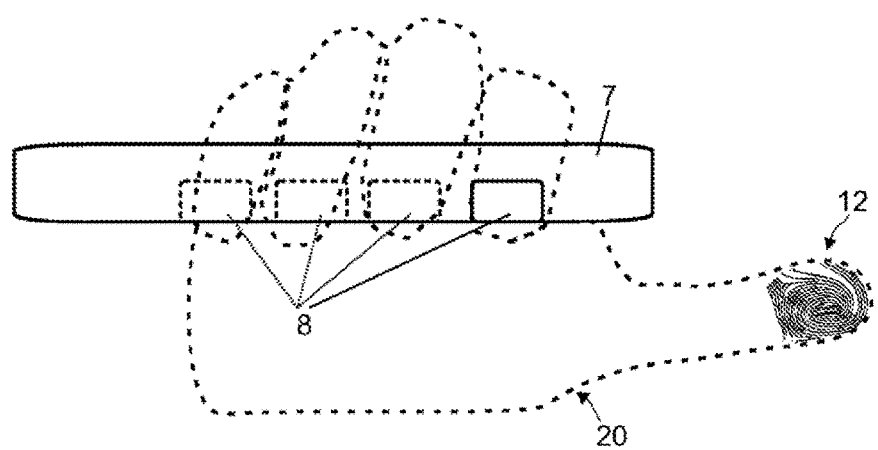
Figure 6:
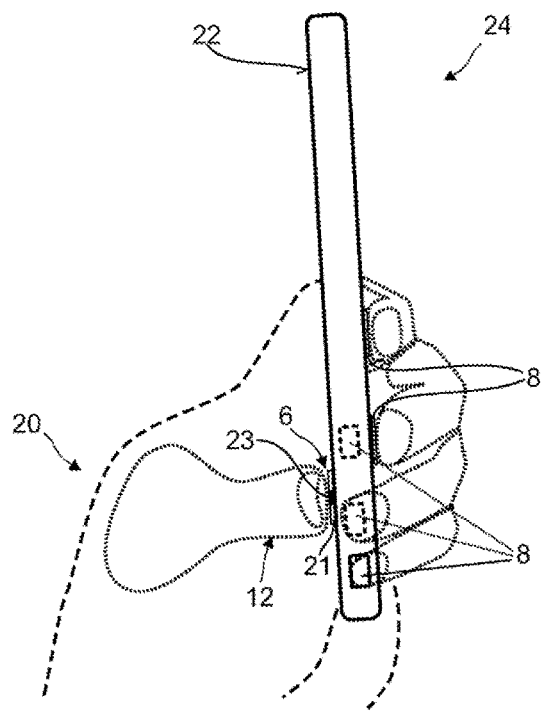
Figure 7:
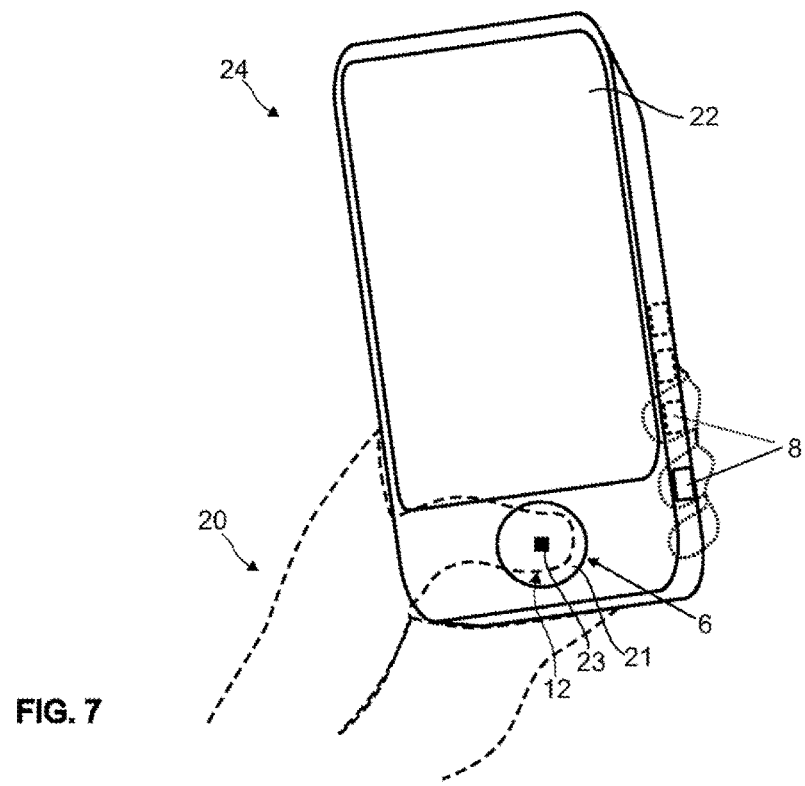
Figure 8:
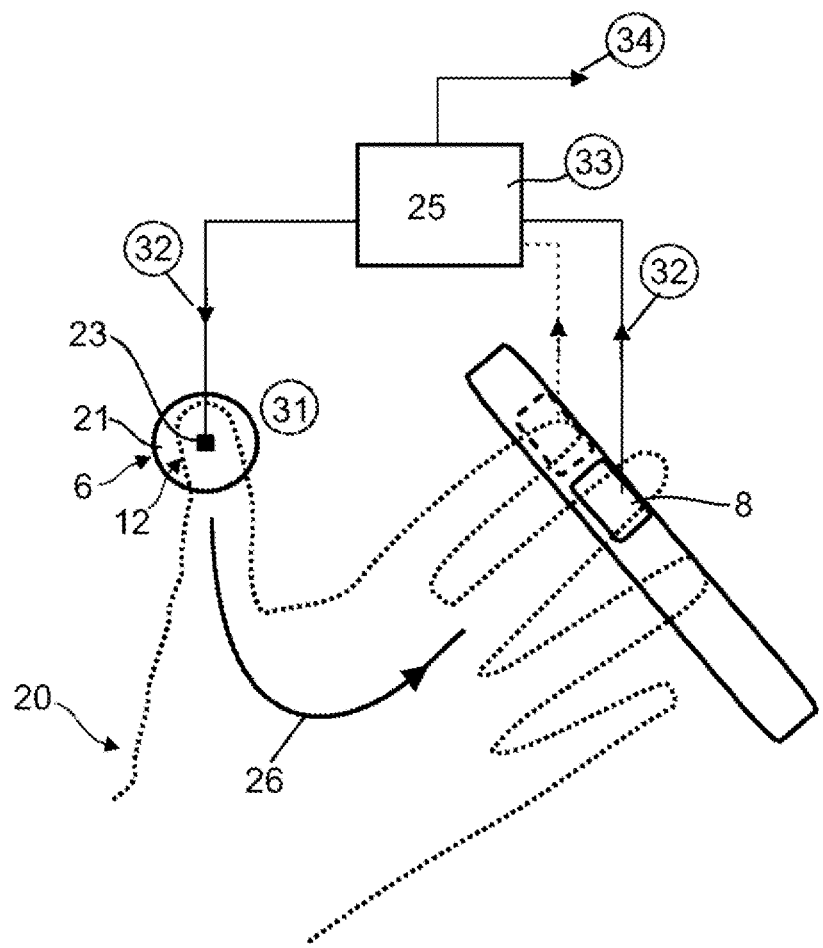

The invention is explained in more detail below on the basis of preferred exemplary embodiments and associated drawings. In the drawings:

FIG. 1: shows an overall view of a device in the form of a gaming and/or amusement machine, which comprises screens and a horizontally aligned operating panel with input means, wherein an embodiment according to the prior art is depicted, in which a fingerprint sensor is provided centrally on a top side of the operating panel, FIG. 2: shows a schematic top view of the top side of a device housing portion, wherein the arrangement for identifying fingerprints according to the invention is attached to the device housing, FIG. 3: shows a schematic top view of a device housing portion similar to FIG. 2 with the arrangement for identifying fingerprints according to the invention, wherein the hand bearing surface is configured as a handle which is grasped by the fingers of a hand, FIG. 4: shows a perspective front view of the device housing portion from FIG. 3, which shows, in an exemplary manner, a positioning of the arrangement according to the invention on the device housing front side and a positioning of a unit made of a fingerprint sensor and first electrode relative to the hand bearing surface, FIG. 5: shows a schematic view of a rear side of a hand bearing surface from FIG. 3 or FIG. 4, configured as a handle, FIG. 6: schematically shows a side view of a mobile device, in particular a smartphone, in which the arrangement for identifying fingerprints according to the invention is used, FIG. 7: shows a schematic overall view of a mobile device, in particular a smartphone, in which the arrangement for identifying fingerprints according to the invention is used, and FIG. 8: shows a sequence of the method for identifying fingerprints with the arrangement according to the invention in a schematic and exemplary manner.

By way of example, the invention may be used in a device 1—as schematically depicted in FIG. 1—for identifying fingerprints. By way of example, the device 1 depicted in FIG. 1 may be embodied as a gaming and/or amusement machine, as used in casinos or arcades. By way of example, the device 1 may be embodied as a standalone device and may comprise a device housing 2 which—loosely speaking—may have an approximately cubic shape, but else a sculpture-like design. One or more screens 3 may be arranged on the device housing 2, but provision may also be made of different indication means, such as e.g. rotating reels.

A device housing portion 4, which advantageously may have a horizontal alignment and, for example, be formed in a panel-like manner, may act as operating portion, wherein input means, for example in the form of operating buttons or touchscreen elements, may be provided at the aforementioned device housing portion 4. While a fingerprint sensor 5 was arranged centrally on a top side of the aforementioned device housing portion 4 with a slight inclination in devices 1 from the prior art, as shown in FIG. 1, the arrangement for identifying fingerprints according to the invention has a special attachment or arrangement in accordance with the exemplary embodiments of the invention, which are shown in FIGS. 2 to 5.

As shown in FIGS. 2 to 4, the aforementioned device housing portion 4, which, when considered in the entirety thereof, may have a horizontal alignment, may comprise a hand bearing surface 7, it being possible for the latter e.g. to be arranged horizontally on a first device housing side 9 which e.g. may form a horizontal top side 9 of the device housing portion 4. A first electrode 23 and e.g. a fingerprint sensor 21 assigned to the first electrode 23 are attached at a distance from the hand bearing surface 7, with the first electrode 23 and the fingerprint sensor 21 being configured as a unit 6. Here, the first electrode 23 of the unit 6 made of fingerprint sensor 21 and first electrode 23 is produced from e.g. light-transmissive material (indium oxide ($In_2O_3$:Sn), zinc oxide (ZnO:Al, ZnO:Ga, ZnO:Ti), tin oxide ($SnO_2$:F, $SnO_2$:Sb, $SnO_2$:Ta) or titanium oxide ($TiO_2$:Nb)) which is at least partly transparent to a querying light beam. Here, the unit 6 made of fingerprint sensor 21 and first electrode 23 may be arranged e.g. on a second device housing side 10 which may be inclined, in particular arranged approximately perpendicular or aligned approximately at right angles, to the aforementioned first device housing side 9. In particular, the unit 6 made of fingerprint sensor 21 and first electrode 23 may be provided on an upright front side 9 of the device housing portion 4. The unit 6 made of fingerprint sensor 21 and first electrode 23 is, in this case, at a distance from the hand bearing surface 7 for the fingers, in particular such that—as depicted in an exemplary manner in FIG. 3—a thumb 12 of a hand 20 intuitively comes to rest in a natural position on the unit 6 made of fingerprint sensor 21 and first electrode 23, with the index to little fingers of said hand, in intended use, resting on the hand bearing surface 7. Here, the unit 6 made of fingerprint sensor 21 and first electrode 23 may be advantageously arranged in a rotatable or tiltable manner. (The corresponding tilt axes 13, 14, 16 and 17 are plotted in FIGS. 3 and 4).

The hand bearing surface 7 depicted in FIG. 2 in an exemplary manner may e.g. be contoured in the form of a slight depression in order to intuitively guide the hand 20 into the correct position. By way of example, an input means, e.g. in the form of an operating button, by means of which e.g. control commands for the device 1 may be entered, may be assigned to the hand bearing surface 7. Attached to the hand bearing surface 7 is at least one second electrode 8, on which at least one finger selected from index finger, middle finger, ring finger or little finger is able to be placed on the at least second electrode 8. By way of example, the at least one second electrode 8 may be integrated into an input means assigned to the hand bearing surface 7 or it may be attached thereon. The at least one second electrode 8 may have the fingerprint sensor 21 instead of the first electrode 23. That is to say, the fingerprint sensor 21 may form a unit 6 with the at least second electrode 8 instead of with the first electrode 23 or the thumb electrode 23. Then, a print of a different finger—e.g. of the index finger—is recorded instead of a print of the thumb 12, said new print then being used for identification purposes. Alternatively, the at least second electrode 8 may likewise have a further fingerprint sensor 21 in addition to the first electrode 23. This means that at least one further fingerprint of a further finger (e.g. of the index finger) of the hand 20 is recorded in addition to the print of the thumb 12 for more accurate identification purposes. The at least second electrode 8 is—particularly if a fingerprint sensor 21 is assigned thereto—ideally produced from light-transmissive material as well.

Furthermore, provision is made—not depicted in FIGS. 2 to 4—of a measurement unit 25 (cf. FIG. 8), by means of which electrical signals may be applied and evaluated between the first electrode 23 and the at least second electrode 8 of the hand bearing surface 7. Here, an identification result is able to be established on the basis of the detected fingerprint by means of the unit 6 made of fingerprint sensor 21 and first electrode 23 and on the basis of the detected signals. Furthermore, the at least second electrode 8 attached to the hand bearing surface 7 may be embodied as a force-effect detection unit. Optionally, the first electrode 23 may also be configured as a force-effect detection unit. By embodying at least the second electrode 8 as a force-effect detection unit, the electrical signals of the measurement unit 25 are only able to be applied or tapped/evaluated in the case of a force exerted by the corresponding finger onto the force-effect detection unit.

Alternatively, when viewed in the entirety thereof, the aforementioned device housing portion 4 may also have an upright alignment. Here, the hand bearing surface 7 on e.g. a (lateral) vertical device housing side and the unit 6 made of fingerprint sensor 21 and first electrode 23 on a vertical front side may be arranged spaced apart from one another in such a way that, when the fingers of the hand 20 are applied to the hand bearing surface 7, the thumb 12 once again intuitively comes to rest on the unit 6 made of fingerprint sensor 21 and first electrode 23. At least one finger selected from index finger, middle finger, ring finger or little finger is placed on the at least second electrode 8 when the hand 20 is applied to the hand bearing surface 7, as a result of which it is possible to establish an identification result from the detected fingerprint and from signals detected by means of the measurement unit 25. The device housing side with the hand bearing surface 7 may preferably be arranged in an inclined fashion in relation to the aforementioned device housing side with the unit 6 (made of fingerprint sensor 21 and first electrode 23) or the hand bearing surface 7 and the unit 6 may be situated on two different planes, said planes having an angle in relation to one another such that the thumb 12 of the hand may be placed comfortably onto the unit 6 when at least one finger selected from index finger, middle finger, ring finger or little finger of this hand is placed on the hand bearing surface 7. An intersection of the two aforementioned planes may in this case lie parallel to a housing edge (preferably a front side facing an operator side).

As depicted in an exemplary manner in FIGS. 3 to 5, the hand bearing surface 7 may also be configured as a handle 7. By way of example, the handle 7 may be embodied in the form of a rod and/or it may be arranged on a housing edge which connects a horizontal top side 9 and an upright front side 10 of the device housing portion 4. In other words, the handle 7 may lie parallel to an intersection of a plane parallel to the top side 9 with a plane parallel to the front side 10. Here, the device housing portion 4 may comprise a recess 18 around the handle 7 such that the hand 20 is able to grasp the handle 7 with index finger, middle finger, ring finger, and little finger. However, the necessary clear space for grasping the handle 7 may also be obtained by e.g. an arcuate or protruding contour of the handle 7, and so the aforementioned recess 18 is not necessary. It is possible to mention that the terms "horizontal", "standing" and "upright" should be understood to mean relative position specifications, i.e. these may relate to a relative reference system of the device or to the Earth's reference system.

As shown in FIGS. 3 and 4, the unit 6 made of fingerprint sensor 21 and first electrode 23 may likewise be assigned to the handle 7, said sensor being arranged at a distance from an end of the handle 7 both transversely in relation to the longitudinal axis 15 of the handle 7 and in the direction of the aforementioned longitudinal axis 15. In particular, the aforementioned unit 6 with the fingerprint sensor 21 may be arranged on the upright front side 10 of the device housing portion 4, wherein the unit 6 or the fingerprint sensor 21 and the first electrode 23 may be arranged at a slight distance, preferably a mean thumb length, preferably 60 to 80 mm, below the handle 7 and away from the handle 7 to one side—to the left in accordance with FIGS. 3 and 4—such that a thumb 12, which is not grasping the handle 7 but spread away from the handle 7, comes to rest on the aforementioned unit 6 made of fingerprint sensor 21 and first electrode 23 in the case of a natural, intuitive thumb position. As a result of a suitable distance between the hand bearing surface/handle 7 and the unit 6 (or the fingerprint sensor 21), it is optionally advantageously possible to realize an indirect age restriction to the extent that e.g. children or adolescents are no longer able to place the thumb 12 onto the unit 6 or the first electrode 23 or the fingerprint sensor 23 when grasping the handle 7 because the distance is too large. Consequently, the e.g. device cannot be put into operation as a result thereof.

FIG. 5 shows the handle 7 from FIG. 3 or 4 from a rear view. As shown by FIG. 5 in particular, the at least second electrode 8 is e.g. attached to a rear side of the handle 7 when, as it were, the hand bearing surface 7 is configured as a handle. As a result, when the handle 7 is grasped by index finger, middle finger, ring finger, and little finger of the hand 20, at least one of these fingers is placed on the at least second electrode 8. A thumb 12 which does not grasp the handle 7 and is spread away intuitively comes to rest on the unit 6 made of fingerprint sensor 21 and first electrode 23, as a result of which the fingerprint of the thumb 12 can be read or detected very easily by the fingerprint sensor 21 of the unit 6, for example by optical or electrical—usually capacitive—means.

The distance of the unit 6 made of fingerprint sensor 21 and first electrode 23 from the aforementioned handle 7 transversely to the handle longitudinal axis 15 and/or in the direction of the handle longitudinal axis 15 from the handle end (downward and to the left in respect of the handle 7 in accordance with FIG. 4) advantageously equals the distance of the thumb tip from the root joint of the index finger, i.e. the usual thumb range when the thumb is spread away, and may be a few centimeters.

As shown in FIG. 3, the unit 6 made of fingerprint sensor 21 and first electrode 23, with a principal axis 13, may be arranged tilted in an acute-angled manner about a angle a in relation to the handle longitudinal axis 15, wherein the aforementioned angle a may be e.g. 5 to 35 degrees, in particular dimensioned in such a way that the principal axis 13 corresponds to the thumb longitudinal axis in the case of a natural thumb position. Such an arrangement or acute-angled inclined alignment in relation to the principal axis 13 of the unit 6 made of fingerprint sensor 21 and first electrode 23 is also advantageous in the case of a hand bearing surface 7 not being configured as a handle—as depicted in an exemplary manner in FIG. 2.

As an alternative or in addition to the twist of the unit 6 made of fingerprint sensor 21 and first electrode 23 in the plane of the front side 10—i.e. about an axis perpendicular to the front side 10—as seen in FIG. 4, the unit 6 made of fingerprint sensor 21 and first electrode 23 may be tilted out of the front side 10 with its bearing surface 21 or the principal axis 13 thereof. This tilt in respect of an upright tilt axis 17 parallel to a front side is shown by the acute angle β, visible in FIG. 2, in relation to the handle longitudinal axis 15. This tilt may likewise lie in the range from approximately two (2) to 35 degrees. Alternatively, or additionally, the unit 6 made of fingerprint sensor 21 and first electrode 23 may also be tilted with the bearing surface thereof about a horizontal tilt axis 16 in relation to the device housing front side 9 or the handle longitudinal axis 15.

The unit 6 made of fingerprint sensor 21 and first electrode 23 is advantageously not rigidly fastened in terms of the alignment thereof in respect of the handle 7 or the hand bearing surface 7 but instead mounted in a rotatable or tiltable manner. A rotatability or tiltability may in this case be provided in respect of one, some or all of the aforementioned tilt axes 14, 16 and 17, wherein the tiltability may be dimensioned in such a way that the unit 6 made of fingerprint sensor 21 and first electrode 23 is able to be brought into various rotational or tilt positions, in which it then keeps its position independently or in a self-locking manner, or else in which it can be fixed by fixation means. Alternatively, or additionally, a restoration into a neutral initial position, for example by means of spring means assigned to the tilt axes, is also possible.

In a further, advantageous configuration of the invention, it is possible, for example, for a unit 6 made of fingerprint sensor 21 and first electrode 23 to be attached symmetrically in relation to a central axis of the hand bearing surface 7 in each case in order to be able to use the arrangement in an equally well fitting manner for the left hand and the right hand. By way of example, in the case of a hand bearing surface 7 embodied as a horizontal handle, one unit 6 made of fingerprint sensor 21 and first electrode 23 may be attached on the left-hand side and a further unit 6 made of fingerprint sensor 21 and first electrode 23 may be attached on the right-hand side, in each case at a distance from said handle 7 and in the vicinity thereof.

However, alternatively, a hand bearing surface 7, in each case adapted accordingly to the respective hand, may be arranged symmetrically in relation to a central axis 11 of the unit 6 made of fingerprint sensor 21 and first electrode 23. That is to say, a first hand bearing surface 7 may be used with e.g. the left hand. A hand bearing surface 7 arranged mirrored on the central axis 11 of the unit 6 made of fingerprint sensor 21 and first electrode 23 may for example be used by the right hand. When the index finger, middle finger, ring finger, and little finger are placed onto the respective hand bearing surface 7, the thumb of the respective hand 20 is intuitively or automatically placed onto the unit 6 made of fingerprint sensor 21 and first electrode 23.

The unit 6 made of fingerprint sensor 21 and first electrode 23, and the aforementioned hand bearing surface 7 with the at least second electrode 8, and also the measurement unit 25 may be arranged directly on/in the device housing of the gaming machine or the main device. In an alternative development of the invention, the device having the unit 6 made of fingerprint sensor and first electrode, and the hand bearing surface 7 may however also be embodied as a separate input device in which, likewise, e.g. the measurement unit 25 is arranged and which has an interface for connection to the main device e.g. in the form of a gaming machine or a PC. This interface may be a wired parallel or serial interface, for example in the form of a USB interface or an RS-232 interface, or else it may be an interface working on wireless principles, for example in the form of a WLAN interface or Bluetooth interface or IrDA interface operating on the basis of infrared signals, or a combination of these interfaces.

As shown schematically in FIGS. 6 and 7, the invention may furthermore be used e.g. in a mobile, battery-operated, accumulator-operated device 24 (cellular telephone, smartphone, handheld device, PDA, games console, tablet) for the purposes of identifying fingerprints.

Here, the unit 6 made of fingerprint sensor 21 and first electrode 23 is arranged or integrated in an input means—e.g. an operating button for activating a display 22 or the electronics of the mobile device 24. Here, the hand bearing surface 7 with the at least one second electrode 8 may—as depicted in e.g. FIG. 7—be provided on a side edge of the mobile device 24. Alternatively, or additionally, the hand bearing surface 7 with the at least second electrode 8 or further electrodes 8 may—as shown in an exemplary manner in FIG. 6—be arranged on a rear side of the mobile device 24. When the mobile device 24 is grasped with the hand 20, e.g. the thumb 12 comes to rest on the input means and hence on the unit 6 made of fingerprint sensor 21 and first electrode 23, while the remaining fingers of the hand 20 are placed on the hand bearing surface 7 and hence the at least second electrode 8 is contacted by at least one of the remaining fingers of the hand 20. When applying the invention in a mobile device such as e.g. a smartphone or tablet PC, the measurement unit 25 may, for example, be installed or integrated into this device.

Alternatively, or additionally, the hand bearing surface 7 or the at least second electrode 8 may also be attached in a protective sleeve for the mobile device 24 or a through-contact to the hand bearing surface 7 or to the at least second electrode 8 may be provided in the protective sleeve. However, it is also possible for the protective sleeve for the mobile device 24 to have a corresponding cutout so that the fingers may be placed on the at least one second electrode 8. Ideally, a user of the mobile device 24 need not take the latter out of the protective sleeve or need not remove the protective sleeve for identification purposes.

FIG. 8 once again shows the arrangement for identifying fingerprints in a schematic form as a block diagram, and an exemplary sequence of a method for identifying fingerprints with the arrangement. As already described on the basis of the preceding FIGS. 2 to 7, the arrangement has a unit 6 consisting of a fingerprint sensor 21 and a first electrode 23. This unit 6 made of fingerprint sensor 21 and first electrode 23 is assigned to a hand bearing surface 7 with at least one second electrode 8 or arranged at a distance from said hand bearing surface 7 in the vicinity thereof. Alternatively, instead of the first electrode 23, the fingerprint sensor 21 may form a unit 6 with the at least second electrode 8, which is assigned to the hand bearing surface 7, or the second electrode 8 has a further fingerprint sensor 21 in addition to the first electrode 23. Furthermore, the arrangement comprises a measurement unit 25 for applying and evaluating electrical signals, which are able to be applied and detected between the first electrode 23 and the at least second electrode 8.

By way of example, if index finger, middle finger, ring finger and/or little finger of a hand 20 are placed onto the hand bearing surface 7, the at least second electrode 8 is contacted by one of these fingers. However, further second electrodes 8 may additionally be provided in the hand bearing surface 7 for a further finger or for a plurality of fingers or for all applied fingers of the hand 20. The assignment of the hand bearing surface 7 with the at least second electrode 8 and the first electrode 23, or the unit 6 made of fingerprint sensor 21 and first electrode 23, is configured in such a way that, when index finger, middle finger, ring finger and/or little finger of the hand 20 are applied, the thumb 12 of this hand 20 comes to rest in an intuitive and automatic manner on the unit 6 made of fingerprint sensor 21 and first electrode 23. That is to say, the thumb 12 of the hand 20 is placed onto the unit 6 made of fingerprint sensor 21 and first electrode 23 and the remaining fingers of the hand 20 are placed on the hand bearing surface with at least one second electrode 8.

In a first method step 31, the fingerprint sensor 21 of the unit 6 detects a fingerprint of the applied thumb 12, e.g. by optical or electrical (usually capacitive) means. To this end, it is possible, for example, for an illumination apparatus to be activated for an image detection and for, the fingerprint by the fingerprint detection apparatus, at least one region of the applied thumb to be detected as a fingerprint image by a detector. Alternatively, the fingerprint sensor 21 may be assigned to the at least second electrode 8; then, for example, a print of a different finger is detected in the first method step 31 instead of a thumbprint, said different finger being applied to the at least second electrode 8 and consequently to the fingerprint sensor assigned to the at least second electrode 8. The detected fingerprint image can then e.g. be buffer stored in the measurement unit 25 and, in a subsequent method step, be forwarded with further data, or immediately, to an overarching system—e.g. a computer system for quality control and/or evaluation. If the fingerprint image is lacking quality, for example if an image contrast is too low, a region of the fingerprint is too small, the number of minutiae points do not suffice, etc., it is possible, for example, for a second fingerprint image to be detected by the fingerprint sensor 21.

As a further alternative embodiment of the invention, it is also possible for the second electrode 8 to have a further fingerprint sensor 21, in addition to the unit 6 made of first electrode 23 and fingerprint sensor 21. Then, e.g. in the first method step 31, it is also possible to detect a print of a further finger of the hand 20—such as e.g. the index finger—by means of the further fingerprint sensor 21, which is assigned to the second electrode 8, in addition to a thumbprint which is detected by the unit 6 made of first electrode 23 and fingerprint sensor 21.

If an acceptable image quality of the detected fingerprint was determined, electrical signals are transferred or fed by the measurement unit 25 to the hand 20, applied by way of the thumb 21 and the remaining fingers, by way of the first electrode 23 and the at least second electrode 8 in a second method step 32. By way of example, voltage signals with variable amplitude and/or frequency may be used as electrical signals. These fed signals are guided via the fingers or the hand 20 applied to the respective electrodes, for example from the measurement unit 25 via the first electrode 23, via a connection 26, which is formed by the hand 20, and via the at least second electrode 8 back to the measurement unit 25, or in the opposite direction.

In a third method step 33, the electrical signals, which are modified by the hand 20 applied to the first electrode 23 and at least one second electrode 8 (e.g. by periodic voltage changes of the pulse, etc.), are detected by the measurement unit 25. Hence, the first electrode 23 and the at least one second electrode 8 act as transmission and reception units for the electrical signals. Then, the detected, modified electrical signals are processed further and evaluated in the measurement unit 25. Thus, an impedance measurement of a hand path 26 from the thumb 12 to one or more of the fingers may be carried out e.g. on the basis of a sequence of electrical signals which are transferred by way of the first electrode 23 and the at least one second electrode 8, with the measurement result then e.g. being compared to a predetermined measurement result range. However, it is also possible only to compare the detected electrical signals from the measurement unit 25 with a predetermined range, e.g. a characteristic measurement range for the determination of life. If the detected, electrical signals lie within a threshold, e.g. for a specific person who e.g. was recorded during a registration, or within a general predetermined threshold for humans, the detected finger may be accepted as real. That is to say, the fingerprint detected in the first method step 31 originates from a living person with a very high probability. If deviations of the detected, electrical signals from the predetermined range are determined in the third method step 33, the detected finger may e.g. be declared fake (e.g. artificial or severed finger, film applied to the finger with fake fingerprint, etc.) and access, entry, etc. may be refused to the associated person.

By way of example, the measurement unit 25 can generate an imitation value on the basis of the comparison of the detected, modified electrical signals with the predetermined range. By way of example, this imitation value can assign a probability of a fake to the detected finger. By way of example, a low value of the imitation value may mean that the probability of a fake is low; a high value of the imitation value may mean the probability of a fake is high.

This imitation value and/or the detected, modified electrical signals may be forwarded in a fourth method step 34, for example together with the fingerprint image detected by the fingerprint sensor 21, to the overarching system for an evaluation and analysis. The fingerprint image may be checked in terms of the quality thereof—as explained in the first method step 31. The detected, modified electrical signals and/or the imitation value may be used for the detection of life or for an evaluation as to whether the applied, detected finger is real (i.e. originates from a living person) or a fake. If no fake is determined the detected fingerprint image can be evaluated and the person can be identified.

In an advantageous development of the arrangement or of the method for identifying fingerprints, at least the second electrode 8 may be embodied as a force-effect detection unit. Here, the electrical signals in the second method step 32 are only applied to the first electrode 23 and the at least second electrode 8 by the measurement unit 25 if force is exerted by the corresponding finger, with the force needing to obtain a predetermined threshold. That is to say, an electrical circuit from the measurement unit 25 via the first electrode 23, the applied hand 20 or via the connection 26 formed thereby, the at least second electrode 8 to the measurement unit 25 (or in the reverse direction) is, as it were, closed when the predetermined threshold is reached. Here, the force-effect detection unit in the at least second electrode 8 has the function of a switch which is closed in the case of a sufficiently large force (=a force reaching or exceeding the threshold).

Alternatively, the electrical signals can already be applied to the electrodes 8, 23 when the respective electrodes 8, 23 are contacted by the respective fingers—i.e. thumb 12 and one of the other fingers—, i.e. as if the at least second electrode 8 were not embodied as a force-effect detection unit. However, the detection and evaluation of the modified, electrical signals in accordance with the third method step 33 is only started once the predetermined threshold for the exerted force on the force-effect detection unit is reached or exceeded. That is to say, the at least second electrode 8 or the force-effect detection unit acts like a switch, by means of which tapping or evaluating of the modified, electrical signals by the measurement unit 25 is started if an appropriate force is exerted.

Optionally, the unit 6 made of fingerprint sensor 21 and first electrode 23 may also be configured as a force-effect detection unit.

By way of example, the force-effect detection unit may be based on a spring-force restoration and/or embodied as a pressure switch. Then, a spring-pressure threshold is advantageously used as a threshold for the force-effect detection unit. Alternatively, use can be made of e.g. a force-measuring, electrical resistor such as e.g. a so-called force-sensing resistor (FSR). The force-effect detection unit is then embodied e.g. as a pressure sensor, in which use is made of a passive component for processing a variable, electrical resistance, wherein the resistance value of this component is modified or reduced with increasing action of force on the sensor.

The electrical signals are only applied to, or tapped or evaluated from, the electrodes 8, 23 by the measurement unit 25 once the corresponding threshold—e.g. a pressure threshold or threshold of the electrical resistance—of the force-effect detection unit is reached or exceeded. Furthermore, an indication apparatus such as e.g. an LED, etc. may be coupled to the force-effect detection unit. This indication apparatus can indicate to the user, e.g. by lighting up, changing color, etc., that the corresponding threshold of the force-effect detection unit, and hence for an identification of the fingerprint, has been reached and further application of force on the force-effect detection unit is no longer necessary.

The security in relation to manipulation may be additionally increased in a simple manner by the configuration of at least the one second electrode 8 as a force-effect unit. This is because a corresponding action of force is not readily realizable with an imitated, artificial finger (e.g. rubber finger) or an imitated hand (e.g. rubber hand), onto which fingerprints were applied for manipulation purposes.

The invention claimed is:

1. An arrangement for identifying fingerprints, comprising:
   at least one fingerprint sensor to detect at least one fingerprint;
   at least two electrodes; and
   a controller to apply and evaluate at least one electrical signal between the two electrodes,
   wherein a first electrode is spaced apart from an at least one second electrode,
   wherein the at least one second electrode is attached to a hand bearing surface,
   wherein the first electrode is configured for the placement of a thumb of a hand and the at least one second electrode is configured for the placement of at least one of an index finger, middle finger, ring finger, and little finger of the hand
   wherein the at least one fingerprint sensor is attached to the at least one of the first electrode and the at least one second electrode,
   wherein the at least one electrical signal is modified by passing through the hand via the first electrode and at least one second electrode, and
   wherein an identification result can be established by the evaluation of the detected fingerprint and the evaluation of the at least one modified electrical signal.

2. The arrangement as claimed in claim 1, wherein the hand bearing surface is configured as a handle, which is able to be grasped by the index finger and/or middle finger and/or ring finger and/or little finger of the hand.

3. The arrangement as claimed in claim 1, wherein the hand bearing surface is provided on a device housing side which is arranged in an inclined manner in relation to a further device housing side, wherein the unit made of fingerprint sensor and first electrode is attached to the further device housing side.

4. The arrangement as claimed in claim 3, wherein the two device housing sides are aligned at approximately right angles in relation to one another.

5. The arrangement as claimed in claim 1, wherein the unit made of fingerprint sensor and first electrode is movably arranged relative to the hand bearing surface, in particular mounted in a rotatable and/or tiltable and/or translationally displaceable manner.

6. The arrangement as claimed in claim 1, wherein the first electrode and the at least one second electrode are produced from a light-transmissive material.

7. The arrangement as claimed in claim 1, wherein the at least second electrode is configured as a force-effect detection unit, wherein the electrical signals are only able to be applied to the respective electrode, and/or tapped/evaluated, by a measurement unit when force is exerted by the corresponding finger onto the force-effect detection unit.

8. The arrangement as claimed in claim 1, wherein the arrangement is employable in a device, in particular in an amusement device or gaming machine, and/or in a mobile device, in particular a smartphone.

9. A method for identifying fingerprints using an arrangement which comprises:
   detecting at least one fingerprint by at least one fingerprint sensor;
   evaluating at least one electrical signal from a controller that has been modified by passing through a hand via a first electrode, configured for placement of a thumb of the hand, and at least one second electrode, configured for placement of at least one of an index finger, middle finger, ring finger, and little finger of the hand; and
   establishing an identification result by the evaluation of the detected fingerprint and the evaluation of the at least one modified signal.

10. The method as claimed in claim 9, wherein a detected fingerprint is forwarded to an overarching system for evaluation and analysis.

11. The method as claimed in claim 9, wherein the detected, modified electrical signals are compared with a predetermined range by a measurement unit.

12. The method as claimed in claim 11, wherein an imitation value is generated by the measurement unit on the basis of a comparison with the predetermined range.

13. The method as claimed in claim 12, wherein the imitation value is forwarded from the measurement unit to the overarching system for an evaluation.

14. The method as claimed in claim 9, wherein voltage signals with variable amplitude and/or frequency are used as electrical signals.

15. The method as claimed in claim 9, wherein the at least one second electrode is embodied as
   a force-effect detection unit, in that the electrical signals are only applied to the respective electrode, and/or tapped/evaluated, by the measurement unit when a predetermined threshold for the exerted force is reached or exceeded in the case of force exerted by the corresponding finger onto the force-effect detection unit.

16. The method as claimed in claim 15, wherein a pressure threshold or threshold for electrical resistance is predetermined as a threshold for the force-effect detection unit.

17. The method as claimed in claim 9, wherein the at least one fingerprint sensor is attached to at least one of the first electrode and the at least one second electrode.

18. An arrangement for identifying fingerprints, comprising:
   at least two electrodes; and
   a controller to apply and evaluate at least one electrical signal between the two electrodes,
   wherein a first electrode is spaced apart from an at least one second electrode,
   wherein the at least one second electrode is attached to a hand bearing surface,
   wherein the first electrode is configured for the placement of a thumb of a hand and the at least one second electrode is configured for the placement of at least one of an index finger, middle finger, ring finger, and little finger of the hand,
   wherein the at least one electrical signal is modified by passing through the hand via the first electrode and at least one second electrode,
   wherein the at least one second electrode is configured as a force-effect detection unit, wherein the electrical signals are only able to be applied to the respective electrode when a force greater than a predetermined threshold is applied to the force-effect detection unit, and wherein an identification result can be established by the evaluation of the detected fingerprint and the evaluation of the at least one modified electrical signal.

19. The arrangement as claimed in claim 18, wherein the hand bearing surface is configured as a handle, which is able to be grasped by the index finger and/or middle finger and/or ring finger and/or little finger of the hand.

20. The arrangement as claimed in claim 18, wherein the hand bearing surface is provided on a device housing side which is arranged in an inclined manner in relation to a further device housing side, wherein the unit made of fingerprint sensor and first electrode is attached to the further device housing side.

\* \* \* \* \*